United States Patent
Rauner et al.

[11] Patent Number: 6,148,855
[45] Date of Patent: Nov. 21, 2000

[54] VALVE CONTROL UNIT AND METHOD OF ATTACHING IT TO A VALVE BLOCK

[75] Inventors: Hans Rauner, Nittenau; Johannes Schoettl, Wörth, both of Germany

[73] Assignee: Siemens Aktiengesellschaft, Munich, Germany

[21] Appl. No.: 09/061,579

[22] Filed: Apr. 16, 1998

[30] Foreign Application Priority Data

Apr. 16, 1997 [DE] Germany .......................... 197 15 916

[51] Int. Cl.⁷ .................................................. F16K 27/00
[52] U.S. Cl. .................... 137/560; 137/884; 303/119.2; 303/119.3
[58] Field of Search ................... 137/560, 884; 303/119.2, 119.3

[56] References Cited

U.S. PATENT DOCUMENTS

| | | | |
|---|---|---|---|
| 5,040,853 | 8/1991 | Burgdorf et al. | 303/119.3 |
| 5,152,322 | 10/1992 | Maas et al. | 137/560 X |
| 5,275,478 | 1/1994 | Schmitt et al. | 137/884 X |
| 5,374,114 | 12/1994 | Burgdorf et al. | 303/113.1 X |
| 5,452,948 | 9/1995 | Cooper et al. | 137/884 X |
| 5,474,108 | 12/1995 | Inden et al. | 137/884 |
| 5,597,015 | 1/1997 | Asou et al. | 137/884 X |
| 5,610,930 | 3/1997 | Macomber et al. | 372/36 |
| 5,692,813 | 12/1997 | Vellmer | 137/884 X |
| 5,741,456 | 4/1998 | Ayrton | 264/400 |
| 5,762,318 | 6/1998 | Staib et al. | 303/119.2 X |
| 5,777,850 | 9/1999 | Jakob et al. | 361/736 |
| 5,835,231 | 12/1998 | Iwamura et al. | 303/119.2 |
| 5,845,672 | 12/1998 | Reuter et al. | 137/884 X |
| 5,886,878 | 3/1999 | Khadem et al. | 361/770 |
| 5,957,547 | 9/1999 | Schliebe et al. | 303/119.3 X |

FOREIGN PATENT DOCUMENTS

| | | |
|---|---|---|
| 0499670B1 | 8/1992 | European Pat. Off. . |
| 0607842A1 | 7/1994 | European Pat. Off. . |
| 4001017A1 | 7/1991 | Germany . |
| 4243180A1 | 8/1993 | Germany . |
| 4225358A1 | 2/1994 | Germany . |
| 4300342A1 | 7/1994 | Germany . |
| 19503778A1 | 8/1996 | Germany . |

*Primary Examiner*—Kevin Shaver
*Assistant Examiner*—John Bastianelli
*Attorney, Agent, or Firm*—Herbert L. Lerner; Laurence A. Greenberg; Werner H. Stemer

[57] ABSTRACT

A valve control unit includes a housing and an electronic circuit disposed therein for controlling valve coils mountable on valves, the housing being formed as a conductor track carrier for carrying the electronic circuit, and conductor tracks carried by the housing, the conductor tracks having contacts for making electrical contact with corresponding opposing contacts of the valve coils.

11 Claims, 1 Drawing Sheet

VALVE CONTROL UNIT AND METHOD OF ATTACHING IT TO A VALVE BLOCK

BACKGROUND OF THE INVENTION

FIELD OF THE INVENTION

The invention relates to a valve control unit having a housing and an electronic circuit disposed therein for controlling valve coils mountable on valves, and to a method of attaching the valve control unit to a valve block. Such valve control units are used particularly for controlling a brake system or an automatic transmission in a motor vehicle.

A valve control unit of this general type has become known heretofore from the published European Patent Document EP 0 499 670 B1. In the production of this control unit, an aluminum plate, serving as a heat sink, is adhesively secured to a printed circuit board. Thereafter, the printed circuit board is outfitted with electronic components which are soldered therein. A coil carrier with an integrated plug-in terminal strip is produced as a hard/soft composite, by two injection molding operations. The thus outfitted and assembled printed circuit board is soldered into the coil carrier. Adhesive is thereupon metered into the sealing groove of the coil carrier, and a lid is placed thereon. The adhesive must then harden.

From the German Published, Non-Prosecuted Patent Application DE 43 00 342 A1, a control unit for a motor-vehicle air bag has become known, which has a tub-shaped housing formed as a three-dimensional printed circuit board. A full-surface metal layer is applied to an outer wall thereof. An inner wall thereof is provided with printed conductors or lines. A circuit can consequently be formed compactly and free of interference in the housing interior.

SUMMARY OF THE INVENTION

It is accordingly an object of the invention to provide a valve control unit which can be produced and connected especially simply to valve coils, and to provide an especially simple method of attaching the valve control unit to a valve block.

With the foregoing and other objects in view, there is provided, in accordance with one aspect of the invention, a valve control unit, comprising a housing and an electronic circuit disposed therein for controlling valve coils mountable on valves, the housing being formed as a conductor track carrier for carrying the electronic circuit, and conductor tracks carried by the housing, the conductor tracks having contacts for making electrical contact with corresponding opposing contacts of the valve coils.

In accordance with another feature of the invention, the contacts are plug contacts for contacting the valve coils, the plug contacts projecting from an inner side of the housing.

In accordance with a further feature of the invention, the plug contacts are integral with the housing.

In accordance with an added feature of the invention, the conductor-track contacts are pressure contacts.

In accordance with an additional feature of the invention, the valve coils are not sealed off from the control circuit.

In accordance with yet another feature of the invention, the housing has an inner side formed with a metallized bearing surface for thermally connecting the control circuit to a valve block.

In accordance with yet a further feature of the invention, an inner side of the housing has a surrounding seal for forming a sealing installation thereof with a valve block.

In accordance with yet an added feature of the invention, the housing has a separate housing part to which the valve coils are secured.

In accordance with yet an additional feature of the invention, the housing is formed as a one-piece tub or cup.

In accordance with a concomitant aspect of the invention, there is included a method of attaching a valve control unit to a valve block, which comprises electrically connecting an electronic control circuit to a cup or tub-shaped housing formed as a conductor track carrier; mounting valve coils on valves of a valve block; and mechanically joining the housing to the valve block so as to make electrical contact between the control circuit and the valve coils.

Because the housing itself has conductor tracks, a printed circuit board can be dispensed with. Moreover, there is no need for a metal plate as a heat sink if a thermal connection from the electronic circuit to the valve block is provided via a metallized bearing surface of the inner side of the housing.

Advantageously, inconvenient soldering of the valve coils into a printed circuit board inside a housing frame is unnecessary.

Other features which are considered as characteristic for the invention are set forth in the appended claims.

Although the invention is illustrated and described herein as embodied in a valve control unit and a method of attaching the valve control unit to a valve block, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, wherein:

DESCRIPTION OF THE PREFERRED EMBODIMENTS

Figure 1:
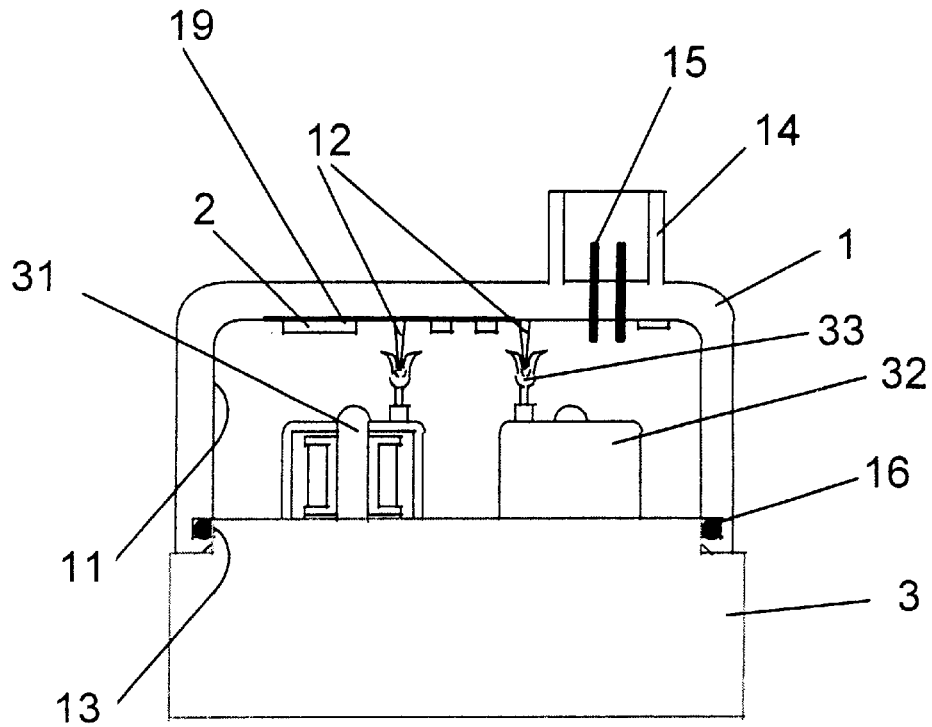
FIG. 1 is a diagrammatic side elevational view of a valve control unit according to the invention which has an integral or one-piece housing.

Referring now to the drawing and, first, particularly to FIG. 1 thereof, there is shown therein an integral or one-piece tub-shaped housing 1 made by the MID, i.e., molded interconnected device, technique. A metallization in the form of printed conductors or lines 19 is provided on an inner side 11 of the housing 1. Such a three-dimensional housing can be formed, for example, by providing the surface of the plastic housing body with an electroplated metallization, and forming the conductor lines therefrom by the use of lasers. Alternatively, the housing may be provided with a flexible foil having conductor lines or tracks.

The inner side 11 of the housing 1 is outfitted or equipped with electronic components of a control circuit 2. The components are directly soldered to the housing 1 formed as a conductive track carrier, or are soldered to the conductors 19 on the inside surface 11 of the housing 1. Polycarbonate, for example, is suitable as the plastic material of the housing body because it is sufficiently resistant to the heat of soldering.

Coil contacts 12 can either be injected into the housing 1 or embodied integrally with the housing and provided with a metallization.

For the purpose of assembly, valve coils 32 are initially slipped onto valves 31 of a valve block 3 of an anti-lock brake system (ABS). The valve coils 32 have tongs-like or alligator-like knife-blade contacts 33 with elastic clips. When the housing 1 is mounted on the valve block 3, a flatly formed coil contact 12 spreads the clips or contact springs of a respective knife-blade contact 33 apart and, thereby, produces a releasable electrical contact. Soldering or a chemical connection of the terminals to be contacted can thus be avoided.

The sealing off of the housing 1 from the valve block 3 is effected by a seal 16 in the form of an O-ring. To that end, the edges of the valve block 3 should be rounded. Additional sealing between the valve coils 32 and the control circuit 2, or between the control circuit 2 and a housing lid is unnecessary. Moreover, no printed circuit board need be mounted in a housing and soldered therein.

A plug-in terminal strip 14 is integrally joined to the housing 1. Plug contacts 15 of the terminal strip 14 are formed by injection into the housing.

The metallization on the inside 11 of the housing is highly suitable for dissipating the heat arising in electronic components of the control circuit 2. This heat can be dissipated to the metal valve block 3 via a metallized bearing surface 13 provided on the inside 11 of the housing.

Figure 2:
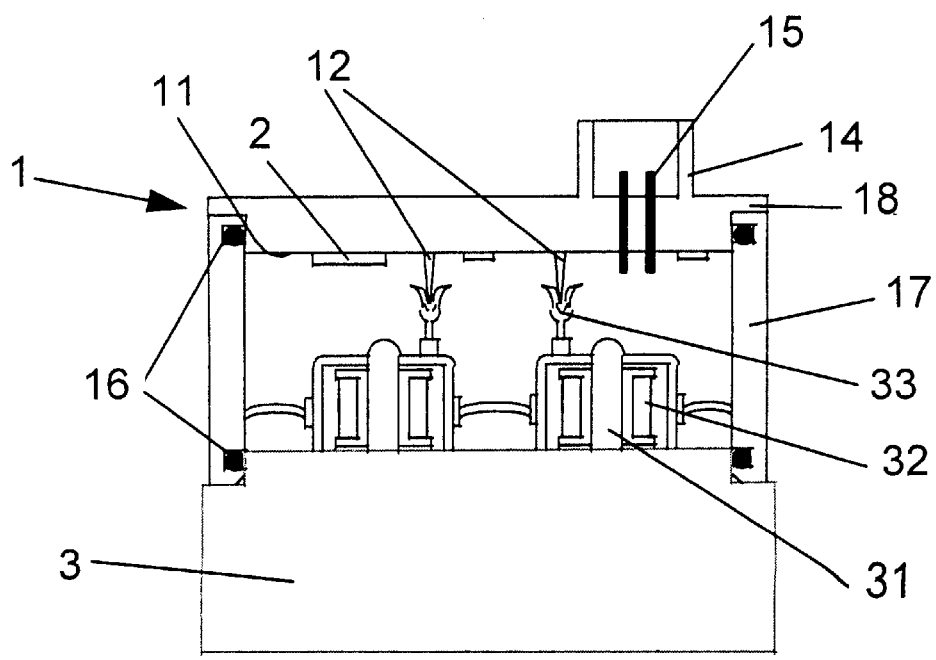
FIG. 2 is a view like that of FIG. 1 of another embodiment of the valve control unit having a two-piece housing.

FIG. 2 shows a bipartite housing 1, with a frame 17 and a lid 18. The lid 18, which is flat and, consequently, may be considered to have no side walls, may be provided on the inside 11 of the housing with an especially easily mountable assembly of electronic components.

The valve coils 32 are injected into the housing frame 17 and elastically anchored through the intermediary of bands formed of plastic material, thereby permitting compensation for tolerances in the assembly of the valve control unit on the valve block 3. All of the valve coils 32, together with the housing frame 17, are attached to the valve block 3 in one operation. Due to the ensuing placement of the lid 18 on top of the housing frame 17, the housing 1 is closed off from the outside, and electrical contact is simultaneously made between the control circuit 2 and the valve coils 32. Both the sealing off of the lid 18 from the frame 17 and the sealing off of the frame 17 from the valve block 3 can be effected with O-ring seals.

We claim:

1. A valve control unit, comprising:
   a housing forming an interior cavity;
   an electronic circuit disposed in said interior cavity for controlling valve coils mountable on valves; and
   conductor tracks carried by said housing,
   said conductor tracks having contacts for making electrical contact with the valve coils, said housing being formed as a conductor track carrier for carrying said electronic circuit, and said electronic circuit and the valve coils being substantially exposed to each other within said interior cavity.

2. The valve control unit according to claim 1, wherein said contacts are knife blade contacts.

3. The valve control unit according to claim 1, wherein said housing has an inner side formed with a metallized bearing surface for thermally connecting said electronic circuit to a valve block.

4. The valve control unit according to claim 1, wherein an inner side of said housing has a surrounding seal for forming a sealing installation thereof with a valve block.

5. The valve control unit according to claim 1, wherein said housing has a separate housing part to which the valve coils are secured.

6. The valve control unit according to claim 1, wherein said housing is formed as a one-piece tub or cup.

7. A method of attaching a valve control unit to a valve block, which comprises:
   electrically connecting an electronic control circuit to an inside surface of a cup or tub-shaped housing formed as a conductor track carrier;
   mounting valve coils on valves of a valve block; and
   mechanically joining the housing to the valve block so as to make electrical contact between the control circuit and the valve coils and such that the control circuit and the valve coils are substantially exposed to each other within the housing.

8. A valve control unit, comprising:
   a housing having an inside surface;
   an electronic circuit disposed on said inside surface in said housing for controlling valve coils mountable on valves; and
   a conductive surface layer on said inside surface of said housing forming conductor tracks, said conductor tracks having contacts for making electrical contact with the valve coils, said housing having an inner side formed with a metallized bearing surface for thermally connecting said electronic circuit to a valve block.

9. The valve control unit according to claim 1, wherein said housing is formed by the molded interconnected device technique.

10. A valve control unit, comprising:
    a housing forming an interior cavity and having an inside surface;
    an electronic circuit disposed on said inside surface in said interior cavity for controlling valve coils mountable on valves; and
    a conductive surface layer on said inside surface of said housing forming conductor tracks, said conductor tracks having contacts for making electrical contact with the valve coils, and said electronic circuit and the valve coils being substantially exposed to each other within said interior cavity.

11. The valve control unit according to claim 1, including metallized coil contacts integrally formed with said housing.

* * * * *